(12) United States Patent
Izumi

(10) Patent No.: US 10,179,505 B2
(45) Date of Patent: Jan. 15, 2019

(54) POWER TRANSMISSION DEVICE

(71) Applicant: HONDA MOTOR CO., LTD., Tokyo (JP)

(72) Inventor: Masao Izumi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 137 days.

(21) Appl. No.: 15/358,403

(22) Filed: Nov. 22, 2016

(65) Prior Publication Data
US 2017/0144528 A1 May 25, 2017

(30) Foreign Application Priority Data
Nov. 24, 2015 (JP) .................................. 2015-228979

(51) Int. Cl.
*B60K 6/387* (2007.10)
*F16D 41/066* (2006.01)
(Continued)

(52) U.S. Cl.
CPC ............ *B60K 6/387* (2013.01); *F16D 41/066* (2013.01); *H02K 7/006* (2013.01); *H02K 7/108* (2013.01); *B60K 6/365* (2013.01); *B60K 6/48* (2013.01); *B60K 6/547* (2013.01); *B60Y 2200/92* (2013.01); *B60Y 2400/421* (2013.01);
(Continued)

(58) Field of Classification Search
CPC combination set(s) only.
See application file for complete search history.

(56) References Cited

U.S. PATENT DOCUMENTS 4,346,773 A * 8/1982 Hofbauer ............... B60K 6/105
180/165
5,482,512 A * 1/1996 Stevenson ............ B60K 6/485
188/70 B
(Continued)

FOREIGN PATENT DOCUMENTS

JP 2002-362197 A 12/2002
JP 2010-516558 A 5/2010
WO 2008/092426 A2 8/2008

OTHER PUBLICATIONS

Office Action dated Oct. 17, 2017, issued in counterpart Japanese Application No. 2015-228979, with English machine translation. (7 pages).
(Continued)

*Primary Examiner* — Robert W Hodge
*Assistant Examiner* — Ryan P Dodd
(74) *Attorney, Agent, or Firm* — Westerman, Hattori, Daniels & Adrian, LLP

(57) ABSTRACT

A power transmission device PT includes a clutch input part 120, a clutch output part 130, a start clutch 110 which can connect the clutch input part 120 and the clutch output part 130 to each other, and an electric motor MG having a rotor MGa. The clutch input part 120, the clutch output part 130, and the start clutch 110 are arranged in the rotor MGa. The power transmission device PT includes a switching mechanism 140 which is switchable between an output side correction state in which the rotor MGa and the clutch output part 130 are connected to each other and an input side connection state in which the rotor MGa and the clutch input part 120 are connected to each other.

5 Claims, 12 Drawing Sheets

(51) Int. Cl.
- H02K 7/00 (2006.01)
- H02K 7/108 (2006.01)
- *B60K 6/48* (2007.10)
- *B60K 6/365* (2007.10)
- *B60K 6/547* (2007.10)
- *F16D 41/06* (2006.01)
- *F16H 3/66* (2006.01)
- *F16D 11/14* (2006.01)
- *F16D 11/16* (2006.01)
- *F16D 25/0638* (2006.01)
- *F16D 41/10* (2006.01)
- *F16D 11/00* (2006.01)

(52) U.S. Cl.
CPC .......... *B60Y 2400/73* (2013.01); *F16D 11/14* (2013.01); *F16D 11/16* (2013.01); *F16D 25/0638* (2013.01); *F16D 41/105* (2013.01); *F16D 2011/004* (2013.01); *F16D 2041/0601* (2013.01); *F16H 3/66* (2013.01); *F16H 2200/0069* (2013.01); *F16H 2200/2012* (2013.01); *F16H 2200/2046* (2013.01); *F16H 2200/2066* (2013.01); *F16H 2200/2082* (2013.01); *Y10S 903/911* (2013.01); *Y10S 903/914* (2013.01); *Y10S 903/919* (2013.01)

(56) References Cited

U.S. PATENT DOCUMENTS

| | | | |
|---|---|---|---|
| 6,736,228 B2* | 5/2004 | Donohue | B60K 6/40 180/65.25 |
| 8,322,503 B2* | 12/2012 | Combes | B60K 6/26 180/65.25 |
| 8,997,956 B2* | 4/2015 | Iwase | B60K 6/26 192/3.26 |
| 2007/0267270 A1* | 11/2007 | Sudau | B60K 6/387 192/48.614 |
| 2011/0118079 A1* | 5/2011 | Mueller | B60K 6/387 477/5 |

OTHER PUBLICATIONS

Office Action dated Oct. 10, 2018, issued in counterpart Chinese Application No. 201610997000.2, with English translation. (6 pages).

\* cited by examiner

FIG.4

| | B1 | B2 | B3 | B4 | C1 | C2 | C3 | SPEED CHANGE RATIO | COMMON RATIO |
|---|---|---|---|---|---|---|---|---|---|
| Rvs | L | | ○ | | | ○ | | 4.008 | |
| 1st | R/L | ○ | ○ | | | | | 5.233 | 1.554 |
| 2nd | R | ○ | ○ | | | | ○ | 3.367 | 1.465 |
| 3rd | R | ○ | ○ | | | ○ | | 2.298 | 1.348 |
| 4th | R | ○ | | | | ○ | ○ | 1.705 | 1.251 |
| 5th | R | ○ | | | ○ | ○ | | 1.363 | 1.363 |
| 6th | R | | | | ○ | ○ | ○ | 1.000 | 1.273 |
| 7th | R | | ○ | | ○ | ○ | | 0.786 | 1.196 |
| 8th | R | | ○ | | ○ | | ○ | 0.657 | 1.126 |
| 9th | R | | ○ | ○ | ○ | | | 0.584 | 1.120 |
| 10th | R | | | ○ | ○ | | ○ | 0.520 | |

POWER TRANSMISSION DEVICE

BACKGROUND OF THE INVENTION

Field of the Invention

The resent invention relates to a power transmission device used for a vehicle which travels using power from an internal combustion engine and an electric motor.

Description of the Related Art

Power transmission devices have been conventionally known which are used. for vehicles which each include a wet start clutch and travel using power from an internal combustion engine and an electric motor (for example, see Japanese Patent Laid-Open No. 2010-516558).

When a transmission with a torque converter which enables travelling using only an internal combustion engine as a motor is modified to a transmission for a hybrid vehicle, an electric motor may be arranged in place of the torque converter. This enables the existing transmission to be used as a transmission for a hybrid vehicle without replacing the transmission.

While travelling using an electric motor, a hybrid vehicle starts an internal combustion engine, if needed. Here, when the travel speed of the hybrid vehicle is excessively low, the rotational speed of the electric motor may be insufficient to reach a startable rotational speed at which the internal combustion engine can be started.

In this case, the rotational speed of the electric motor needs to be increased to the startable rotational speed, and a transmission amount needs to be adjusted by adjusting the engaging force of a friction clutch, etc. in the transmission so as to prevent excessive increase in driving power transmitted to a driving wheel. However, in a conventional transmission, an adjustment part which adjusts a transmission amount is not intended to adjust a transmission amount of driving power required for starting. Accordingly, the volume of the adjustment part needs to be increased, and a great modification of the conventional transmission is required.

Alternatively, a rotor of the electric motor may be connected to the internal combustion engine side to achieve connection between the electric motor and the transmission via a start clutch. In this case, however, an electric motor is always associated with the internal combustion engine while travelling using only the electric motor, and thus, efficiency in travelling using the electric motor only is deteriorated.

SUMMARY OF THE INVENTION

In view of the above points, an object of the present invention is to provide a power transmission device which can use a conventional transmission as it is, without deteriorating efficiency in travelling using an electric motor only.

[1] To achieve the above object a power transmission device of the present invention includes.

a clutch input part to which driving power is transmitted from an internal combustion engine;

a clutch output part which is connected to a transmission;

a start clutch which can connect the clutch input part and the clutch Output part to each other: and an electric motor which has a rotor, wherein the clutch input part, the clutch output part, and the start clutch are arranged in the rotor, and the power transmission device further comprises a switching mechanism which is switchable between an output side connection state in which the rotor and the clutch output part are connected to each other and an input side connection state in which the rotor and the clutch input part are connected to each other.

According to the power transmission device of the present invention, a conventional transmission can be used as it is, without deteriorating efficiency in travelling using the electric motor only.

[2] Further, the present invention may have a configuration in which the switching mechanism includes: a slider which is movable in an axial direction: an actuator which moves the slider; an internal combustion engine side ball which is arranged, at the internal combustion, engine side, radially inward of the rotor; and a transmission side ball which is arranged, at the transmission side, radially inward of the rotor, and further includes; an output side receiving hole which can receive the transmission side hall is provided in the clutch output part; an input side receiving hole which can receive the internal combustion engine side ball is provided in the clutch input part, and wherein: when the slider is positioned at the transmission side, the switching mechanism enters the output side connection state by causing the transmission side ball to engage with the output side receiving hole to cause the rotor and the clutch output part to engage with each other; and when the slider is positioned at the internal combustion engine side, the switching mechanism enters the input side connection state by causing the internal combustion engine side ball to engage with the input side receiving hole to cause the rotor and the clutch input part to engage with each other.

[3] Moreover, in the present invention, it is preferred that the input side receiving hole is formed to be depth less than the radius of the internal combustion engine side hall, and the output side receiving hole is formed to be in depth less than the radius of the transmission side ball.

[4] Further, in the present invention, the rotor may have a magnet which maintains a state in which the internal combustion engine side ball and the transmission side ball are off from the input side receiving hole and the output side receiving hole, respectively.

[5] Moreover, the present invention may have a configuration in which the switching mechanism includes a cylindrical slider which is movable in an axial direction and an actuator which moves the slider, and, on the inner circumferential surface of the slider, a transmission side internal tooth positioned at the transmission side and an internal combustion engine side internal tooth positioned at the internal combustion engine side are provided, an output side external tooth which can mesh the transmission side internal tooth is provided on the clutch output part, an input side external tooth which can mesh the internal combustion engine side internal tooth is provided on the clutch input pan, and when the slider is positioned at the transmission side, the switching mechanism causes the transmission internal tooth to engage with the output side external tooth to cause the rotor and the clutch output part to engage with each other, when the slider is positioned at the internal combustion engine side, the switching mechanism causes the internal combustion, engine side internal tooth to engage with the input side external tooth to cause the rotor and the clutch input part to engage with each other.

[6] Further, the present invention may have a configuration in which the switching mechanism is switchable to, in addition to the output side connection state and the input side connection state, a neutral state in which connections between the rotor and the clutch output part, and between the rotor and the clutch input part are cut off.

According to this configuration, when the vehicle travels using driving power of the internal combustion engine only, for example, when regeneration by the electric motor is impossible because sufficient power is stored in a secondary battery, or when the electric motor does not work, deterioration in efficiency due to companion turning by the electric motor can be prevented by bringing the switching mechanism into the neutral state.

BRIEF DESCRIPTION OF THE DRAWINGS

FIG. 4 is a diagram showing the relationship between engagement elements and the gear positions of the transmission of the first embodiment;

FIG. 5A, FIG. 5B, and FIG. 5C are diagrams in which FIG. 5A is a diagram illustrating an idling state of a two-way clutch of the first embodiment, FIG. 5B is a diagram illustrating a state where one rotation of the two-way clutch of the first embodiment is inhibited, and FIG. 5C is a diagram illustrating a state where the other rotation of the two-way clutch of the first embodiment is inhibited;

DETAILED DESCRIPTION OF THE REFERRED EMBODIMENTS

[First Embodiment]

Figure 1:
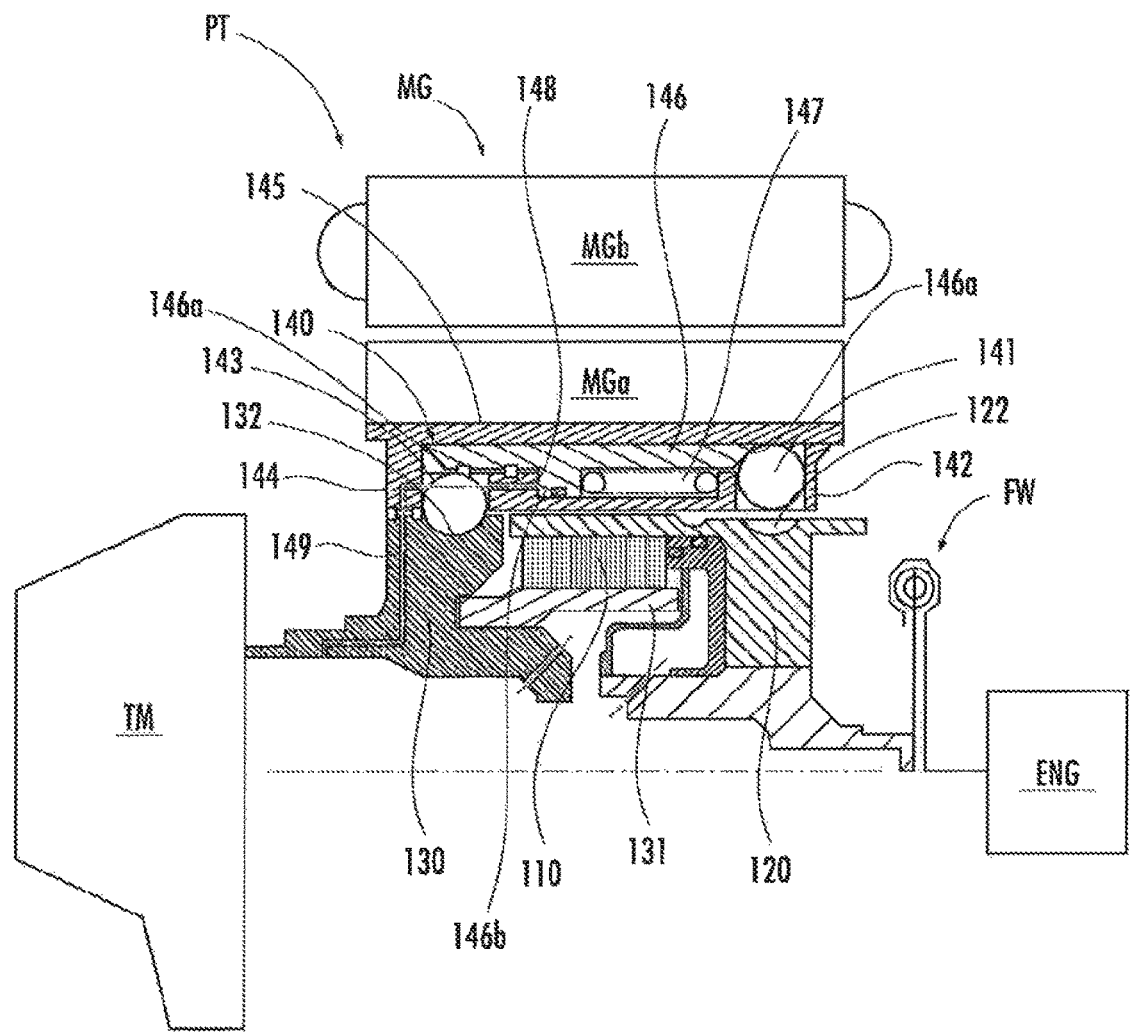
FIG. 1 is a diagram illustrating a first embodiment of a power transmission device of the present invention.

As illustrated in FIG. 1, a power transmission device PT of a first embodiment of the present invention transmits power of an internal combustion engine ENG to a transmission TM in a releasable manner, and includes an electric motor MG that has a rotor MGa and a stator MGb and that is capable of generating power. In FIG. 1, the power transmission device PT is illustrated in larger size than the internal combustion engine ENG and the transmission TM, and only a part thereof above a rotational axis line indicated by an alternate long and short dash line is illustrated.

Figure 2:
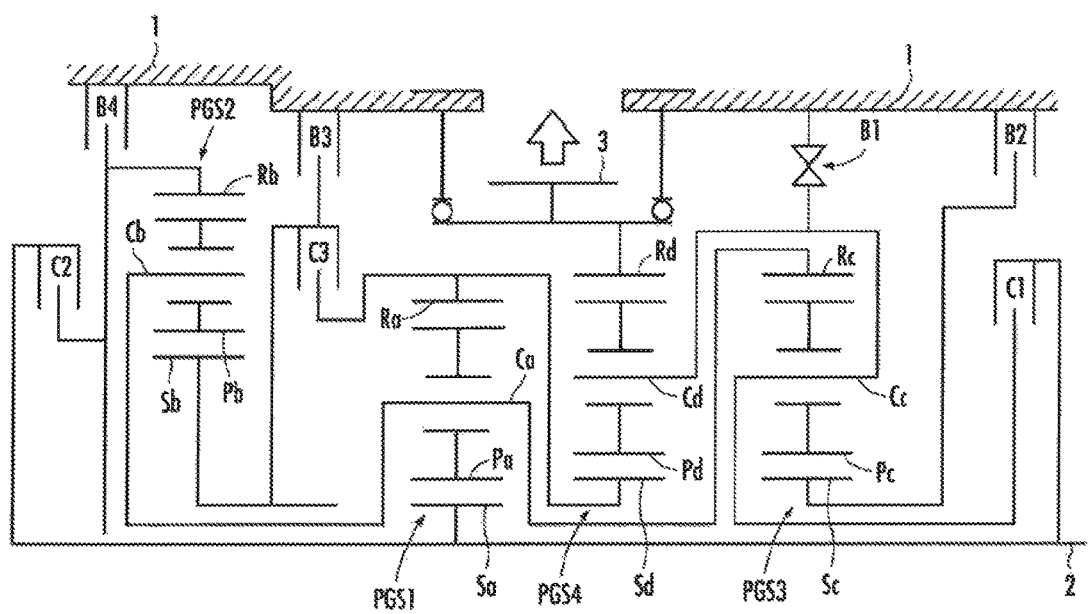
FIG. 2 is a skeleton diagram illustrating a transmission of the first embodiment.

FIG. 2 illustrates the automatic transmission TM of the first embodiment, The automatic transmission TM includes an input shaft 2 as an input part which is rotatably supported in a casing 1, and to which driving power outputted from a dual mass flywheel FW by the internal combustion engine ENG is transmitted via the power transmission device PT, and an output part 3 which is formed of an output gear arranged concentrically with the input shaft 2. Rotation of the output part 3 is transmitted to a driving wheel of a vehicle via a differential gear, a propeller shaft, or a transfer (not illustrated).

In the casing 1, first to fourth planetary gear mechanisms PGS1 to PGS4 are arranged concentrically with the input shaft 2. The first planetary gear mechanism PGS1 is constructed of a single pinion type planetary gear mechanism which includes a sun gear Sa, a ring gear Ra, and a carrier Ca supporting, in a rotatable and revolvable manner, the shaft of a pinion Pa which meshes with the sun gear Sa and the ring gear Ra (this mechanism is also referred to as "minus planetary gear mechanism" or "negative planetary gear mechanism" because when the carrier is fixed and the sun gear is rotated, the ring gear rotates in a direction different from the rotational direction of the sun gear. When the ring gear is fixed and the sun gear is rotated, the carrier rotates in a direction same as the rotational direction of the sun gear).

Figure 3:
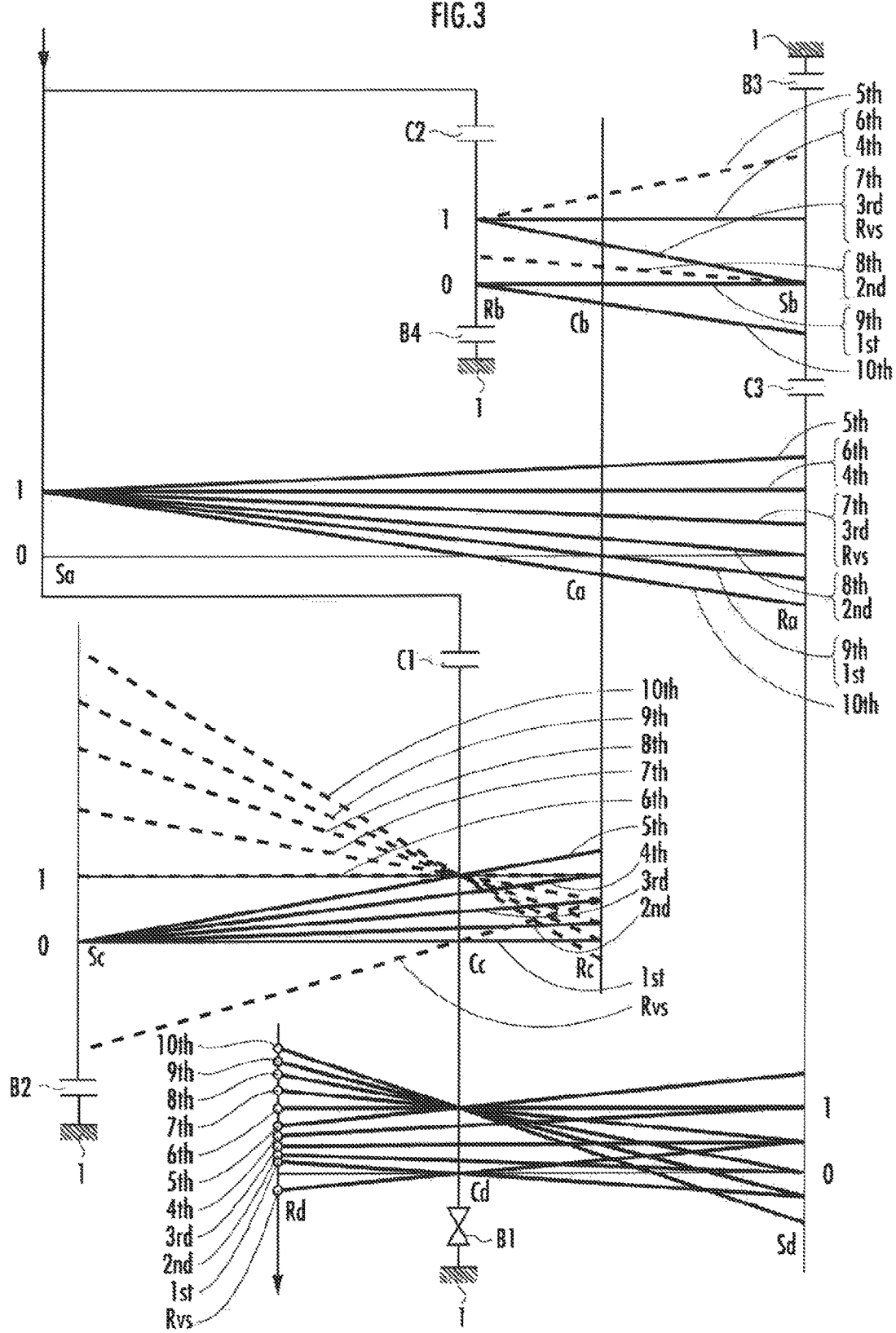
FIG. 3 illustrates alignment charts showing speed lines of gear positions of the transmission of the first embodiment.

FIG. 3 illustrates alignment charts of the first to fourth planetary gear mechanisms PGS1 to PGS4. Herein, the alignment chart is defined as a diagram showing the ratios of the relative rotational speeds among three elements, which are the sun gear, the carrier, and the ring gear, by straight lines (speed lines). In the alignment chart, the three elements are shown at intervals which correspond to gear ratios (the number of teeth of the ring gear/the number of teeth of the sun gear).

Reference is made to the alignment chart of the first planetary gear mechanism PGS1, shown at the second alignment chart from the top in FIG. 3. The three elements, Sa, Ca, Ra of the first planetary gear mechanism PGS1 are assumed to be a first element, a second element, and a third element, from the left side in the drawing, respectively. That is, the first element is the sun gear Sa, the second element is the carrier Ca, and the third element is the ring gear Ra.

Here, the ratio of the interval between the sun gear Sa and the carrier Ca and the interval between the carrier Ca and the ring gear Ra is set to h:1, wherein h represents the gear ratio the first planetary gear mechanism PGS1. In the alignment chart, the lower horizontal line and the upper horizontal line (a line overlapping with the 4th and 6th lines) indicate the rotational speeds of "0" and "1" (the same rotational speed as the input shaft 2), respectively.

The second planetary gear mechanism PGS2 is also constructed of a single pinion type planetary gear mechanism which includes a sun gear Sb, a ring gear Rb, and a carrier Cb supporting, in a rotatable and revolvable manner, the shaft of a pinion Pb which meshes with the sun gear Sb and the ring gear Rb.

Reference is made to the alignment chart of the second planetary gear mechanism PGS2 shown at the first (top) alignment chart from the top in FIG. 4. The three elements, Sb, Cb, Rb of the second planetary gear mechanism PGS2 are assumed to be a fourth element, a fifth element, and sixth element, and a sixth element, from the left side in the chart, respectively. That is the fourth element is the ring gear Rb, the fifth element is the carrier Cb, and the sixth element is the sun gear Sb. The ratio of the interval between the sun gear Sb and the carrier Cb and the interval between the carrier Cb and the ring gear Rb is set to i:1, wherein i represents the gear ratio of the second planetary gear mechanism PGS2.

The third planetary gear mechanism PGS3 is also constructed of a single pinion type planetary gear mechanism which includes a sun gear Sc, a ring gear Rc, and a carrier Cc supporting, in a rotatable and revolvable manner, the shaft of a pinion Pc which meshes with the sun gear Sc and the ring gear Rc.

Reference is made to the alignment chart of the third planetary gear mechanism PGS3 shown at the third alignment chart from the top in FIG. 3. The three elements, Sc, Cc, Rc of the third planetary gear mechanism PGS3 are assumed to be a seventh element, an eighth element, and a ninth element, from the left side in the chart, respectively. That is, the seventh element is the sun gear Sc, the eighth element is the carder Cc, and the ninth element is the ring gear Rc. The ratio of the interval between the sun gear Sc and the carrier Cc and the interval between the carrier Cc and the ring gear Rc is set to j:1, wherein j represents the gear ratio of the third planetary gear mechanism PGS3.

The fourth planetary gear mechanism PGS4 is also constructed of a single pinion type planetary gear mechanism which includes a sun gear Sd, a ring gear Rd, and a carrier Cd supporting, in a rotatable and revolvable manner, the shaft of a pinion Pd which meshes with the sun gear Sd and the ring gear Rd.

Reference is made to the alignment chart of the fourth planetary gear mechanism PGS4 shown at the fourth (bottom) alignment chart from the top in FIG. 3. The three elements, Sd, Cd, Rd of the fourth planetary gear mechanism PGS4 are assumed to be a tenth element, an eleventh element, and a twelfth element, from the left side in the chart, respectively. That is, the tenth element issue ring gear Rd, the eleventh element is the carrier Cd, and the twelfth element is the sun gear Sd. The ratio of the interval between the sun gear Sd and the carrier Cd and the interval between the carrier Cd and the ring gear Rd is set to k:1, wherein k represents the gear ratio of the fourth planetary gear mechanism PGS4.

The sun gear Sa (the first element) of the first planetary gear mechanism PGS1 is connected to the input shaft 2. The ring gear Rd (the tenth element) of the fourth planetary gear mechanism PGS4 is connected to an output part 3 formed of an output gear.

The carrier Ca (the second element) of the first planetary gear mechanism PGS1, the carrier Cb (the fifth element) of the second planetary gear mechanism PGS2, and the ring gear Rc (the ninth element) of the third planetary gear mechanism PGS3 are connected with one another to form a first connection body Ca-Cb-Rc. The ring gear Ra (the third element) of the first planetary gear mechanism PGS1 and the sun gear Sd (the twelfth element) of the fourth planetary gear mechanism PGS4 are connected with each other to form a second connection body Ra-Sd. The carrier Cc (the eighth element) of the third planetary gear mechanism PGS3 and the carrier Cd (the eleventh element) of the fourth planetary gear mechanism PGS4 are connected with each other to form a third connection body Cc-Cd.

The automatic transmission TM of the present embodiment includes one switching mechanism which is a first brake B1 and six engagement mechanisms which are three first to third clutches C1 to C3 and three second to fourth brakes B2 to B4. The first clutch C1 is a hydraulic operation type wet multiplate clutch, and is configured to be switchable between a connection state in which the sun gear Sa (the first element) of the first planetary gear mechanism PGS1 is connected the third connection body Cc-Cd and a release state in which the connection is cut off.

The second clutch C2 is a hydraulic operation type wet multiplate clutch, and is configured to be switchable between a connection state in which the sun gear Sa (the first element) of the first planetary gear mechanism PGS1 is connected to the ring gear Rb (the fourth element) of the second planetary gear mechanism PGS2 and a release state in which the connection is cut off. The third clutch C3 is a hydraulic operation type wet multiplate clutch, and is configured to be switchable between a connection state in which the sun gear Sb (the sixth element) of the second planetary gear mechanism PGS2 is connected to the second connection body Ra-Sd and a release state in which the connection is cut off.

The first brake B1 is a two-way clutch, and is configured to be switchable between a reverse rotation inhibiting state in which forward rotation of the third connection body Cc-Cd (rotation in a direction same as the rotational direction of the input shaft 2) is allowed but the reverse rotation is inhibited and a fixation state in which the third connection body Cc-Cd is fixed to the easing 1 and rotation of the third connection body Cc-Cd is inhibited. The second brake B2 is a hydraulic operation type wet multiplate brake, and is configured to be switchable between a fixation state in which the sun gear Sc (the seventh element) of the third planetary gear mechanism PGS3 is fixed to the casino 1 and a release state in which the fixation is released.

The third brake B3 is a hydraulic operation type wet multiplate brake, and is configured to be switchable between a fixation state in which the sun gear Sb (the sixth element) of the second planetary gear mechanism PGS2 is fixed to the casing 1 and a release state in which the fixation is released. The fourth brake B4 is a hydraulic operation type wet multiplate brake, and is configured to be switchable between a fixation state in which the ring gear Rb (the fourth element) of the second planetary gear mechanism PGS2 is fixed to the casing 1 and a release state in which the fixation is released.

States of the clutches C1 to C3 and the brakes B1 to B4 can be switched, on the basis of vehicle information such as the travel speed of the vehicle, by a control ECU (see FIG. 1) formed of a transmission control unit.

On the axis line of the input shaft 2, the first clutch C1, the third planetary gear mechanism PGS3, the fourth planetary gear mechanism PGS4, the first planetary gear mechanism PGS1, the third clutch C3, the second planetary gear mechanism PGS2, and the second clutch C2 are arranged in this order from the internal combustion engine ENG side.

The fourth brake B4 is arranged radially outward of the second planetary gear mechanism PGS2, the third brake B3 is arranged radially outward of the third clutch C3, the first brake B1 is arranged radially outward of the third planetary gear mechanism PGS3, and the second brake B2 is arranged radially outward of the first clutch 1. As a result of arranging the four brakes B1 to B4 radially outward of the planetary gear mechanisms or the clutches in this way, the axis length of the automatic transmission TM can be reduced further, compared to a case where the four brakes B1 to B4 are arranged on the axis line of the input shaft 2 together with the planetary gear mechanisms and the clutches. Alternatively, the fourth brake B4 may be arranged radially outward of the second clutch C2 and the third brake B3 may be arranged radially outward of the second planetary gear mechanism PGS2.

Next, cases of establishing the gear positions of the automatic transmission TM of the embodiment are described with reference to FIGS. 3 and 4.

To establish a first gear position, the first brake B1 which is a two-way clutch is brought into the reverse rotation inhibiting state ("R" in FIG. 4), and the second brake B2 and the third brake B3 are brought into the fixation states. As a result of bringing the first brake B1 into the reverse rotation inhibiting state, reverse rotation of the third connection body Cc-Cd is inhibited. As a result of bringing the second brake B2 into the fixation states, the rotational speed of the sun gear Sc (the seventh element) of the third planetary gear mechanism PGS3 becomes "0". Accordingly, the rotational speed of the third connection body Cc-Cd also becomes "0".

As a result, a rock state in which relative rotation of the seventh to ninth elements Sc, Cc, and Rc of the third planetary gear mechanism PGS3 is not allowed is established so that the rotational speed of the first connection body Ca-Cb-Rc including the ring gear Rc (the ninth element) of the third planetary gear mechanism PGS3 also becomes "0". Thus, the rotational speed of the ring gear Rd (the tenth element) of the fourth planetary gear mechanism PGS4 to which the output part 3 is connected becomes "1st" shown in FIG. 4. Accordingly, the first gear position is established.

The fixation state of the third brake B3 is not required in order to establish the first gear position, but the fixation state is established so as to allow smooth transmission from the first gear position to a second gear position, which is described later. Further, in order to apply engine brake effectively at the first gear position, the first brake B1 formed of a two-way clutch may be switched to the fixation state ("L" in FIG. 4).

To establish the second gear position, the first brake B1 which is a two-way clutch is brought into the reverse rotation inhibiting state ("R" in FIG. 4), the second brake B2 and the third brake B3 are brought into the fixation states, and the third clutch C3 is brought into the connection state. As a result of bringing the first brake B1 into the reverse rotation inhibiting state, forward rotation of the third connection body Cc-Cd is allowed. As a result of bringing the second brake B2 into the fixation state, the rotational speed of the sun gear Sc (the seventh element) of the third planetary gear mechanism PGS3 becomes "0". As a result of bringing the third brake B3 into the fixation state, the rotational speed of the sun gear Sb (the sixth element) of the second planetary gear mechanism PGS2 becomes "0".

In addition, as a result of bringing the third clutch C3 into the connection state, the rotational speed of the second connection body Ra-Sd becomes "0" which is equal to the rotational speed of the sun gear Sb (the sixth element) of the second planetary gear mechanism PGS2. Thus, the rotational speed of the ring gear Rd (the tenth element of the fourth planetary gear mechanism PGS4 to which the output part 3 is connected becomes "2nd" shown in FIG. 3. Accordingly, the second gear position is established.

To establish a third gear position, the first brake B1 which is a two-way clutch is brought into the reverse rotation inhibiting state, the second brake B2 and the third brake B3 are brought into the fixation states, and the second clutch C2 is brought into the connection state. As a result of bringing the first brake B1 into the reverse rotation inhibiting state, forward rotation of the third connection body Cc-Cd is allowed. As a result of bringing the second brake B2 into the fixation state, the rotational speed of the sun gear Sc (the seventh element) of the third planetary gear mechanism PGS3 becomes "0". As a result of bringing the third brake B3 into the fixation state, the rotational speed of the sun gear Sb (the sixth element) of the second planetary gear mechanism PGS2 becomes "0".

In addition, as a result of bringing the second clutch C2 into the connection state, the rotational speed of the ring gear Rb (the fourth element) of the second planetary gear mechanism PGS2 becomes "1" which is equal to the rotational speed of the sun gear Sa (the first element) of the first planetary gear mechanism PGS1 which is connected to the input shaft 2. Since the rotational speed of the sun gear Sb (the sixth element) of the second planetary gear mechanism PGS2 is "0" and the rotational speed of the ring gear Rb (the fourth element) is "1", the rotational speed of the carrier Cb (the fifth element), that is, the rotational speed of the first connection body Ca-Cb-Rc becomes i/(i+1). Thus, the rotational speed of the ring gear Rd (the tenth element) of the fourth planetary gear mechanism PGS4 to which the output part 3 is connected becomes "3rd" shown in FIG. 3. Accordingly, the third gear position is established.

To establish a fourth gear position, the first brake B1 which is a two-way clutch is brought into the reverse rotation inhibiting state, the second brake B2 is brought into the fixation state, and the second clutch C2 and the third clutch C3 are brought into the connection states. As a result of bringing the first brake B1 into the reverse rotation inhibiting state, forward rotation of the third connection body Cc-Cd is allowed. As a result of bringing the second brake B2 into the fixation state, the rotational speed of the sun gear Sc (the seventh element) of the third planetary gear mechanism PGS3 becomes "0".

In addition, as a result of bringing the third clutch C3 into the connection state, the sun gear Sb (the sixth element) of the second planetary gear mechanism PGS2 and the second connection body Ra-Sd are rotated at the same speed. Thus, between the first planetary gear mechanism PGS1 and the second planetary gear mechanism PGS2, the carrier Ca (the second element) is connected to the carrier Cb (the fifth element), and the ring gear Ra (the third element) is connected to the sun gear Sb (the sixth element). Accordingly, at the fourth gear position in which the third clutch C3 is in the connection state, one alignment chart, which consists of the four elements, of the first planetary gear mechanism PGS1 and the second planetary gear mechanism PGS2 can be illustrated.

In addition, as a result of bringing the second clutch C2 into the connection state, the rotational speed of the ring gear Rb (the fourth element) of the second planetary gear mechanism PGS2 becomes "1" which is equal to the rotational speed of the sun gear Sa (the first element) of the first planetary gear mechanism PGS1, and the rotational speeds of two of the fourth elements of the first planetary gear mechanism PGS1 and the second planetary gear mechanism PGS2 become same "1".

Therefore, a rock state in which relative rotation of the elements of the first planetary gear mechanism PGS1 and the second planetary gear mechanism PGS2 is not allowed is established, and thus, the rotational speeds of all the elements of the first planetary gear mechanism PGS1 and the second planetary gear mechanism PGS2 become "1". Thus, the rotational speed of the third connection body Cc-Cd becomes j/(j+1) and the rotational speed of the ring gear Rd (tenth element) of the fourth planetary gear mechanism PGS4 to which the output part 3 is connected becomes "4th" shown in FIG. 3. Accordingly, the fourth gear position is established.

To establish a fifth gear position, the first brake B1 which is a two-way clutch is brought into the reverse rotation inhibiting state, the second brake B2 is brought into the fixation state, and the first clutch C1 and the second clutch C2 are brought into the connection states. As a result of bringing the first brake B1 into the reverse rotation inhibiting state, forward rotation of the third connection body Cc-Cd is allowed. As a result of bringing the second brake B2 into the fixation state, the rotational speed of the sun gear Sc the seventh element) of the third planetary gear mechanism PGS3 becomes "0".

In addition, as a result of bringing the first clutch C1 into the connection state, the rotational speed of the third connection body Cc-Cd becomes "1" which is equal to the rotational speed of the sun gear Sa (the first element) of the first planetary gear mechanism PGS1. Thus, the rotational speed of the ring gear Rd (the tenth element) of the fourth planetary gear mechanism PGS4 to which the output part 3 is connected becomes "5th" shown in FIG. 3. Accordingly, the fifth gear position is established.

The connection state of the second clutch C2 is not required in order to establish the fifth gear position. However, since the connection state of the second clutch C2 is required at the fourth gear position and at a sixth gear position, which is described later, the connection state is established at the fifth gear position so as to allow smooth downshift from the fifth gear position to the fourth gear position and smooth upshift from the fifth gear position to the sixth gear position, which is described later.

To establish the sixth gear position, the first brake B1 which is a two-way clutch is brought into the reverse rotation inhibiting state, and the first to third clutches C1 to C3 are brought into the connection states. As a result of bringing the first brake B1 into the reverse rotation inhibiting state, forward rotation of the third connection body Cc-Cd is allowed.

In addition, as a result of bringing the second clutch C2 and the third clutch C3 into the connection states, relative rotation of the elements of the first planetary gear mechanism PGS1 and the second planetary gear mechanism PGS2 is not allowed, as described as to the fourth gear position, and the rotational speed of the second connection body Ra-Sd becomes "1". As a result of bringing the first clutch C1 into the connection state, the rotational speed of the third connection body Cc-Cd becomes "1".

Therefore, in the fourth planetary gear mechanism PGS4, the speeds of the carrier Cd the eleventh element) and the sun gear Sd (the twelfth element) become same "1", and a rock state in which relative rotation of the elements is not allowed is established. Thus, the rotational speed of the ring gear Rd (the tenth element) of the fourth planetary gear mechanism PGS4 to which the output part 3 is connected becomes "1" as shown as "6th" in FIG. 3. Accordingly, the sixth gear position is established.

To establish a seventh gear position, the first brake B1 which is a two-way clutch is brought into the reverse rotation inhibiting state, the third brake B3 is brought into the fixation state, and the first clutch C1 and the second clutch C2 are brought into the connection states. As a result of bringing the first brake B1 into the reverse rotation inhibiting state, forward rotation of the third connection both Cc-Cd is allowed.

In addition, as a result of bringing the third brake B3 into the fixation state, the rotational speed of the sun gear Sb (the sixth element) of the second planetary gear mechanism PGS2 becomes "0". As a result of bringing the second clutch C2 into the connection state, the rotational speed of the ring gear Rb (the fourth element) of the second planetary gear mechanism PGS2 becomes "1" which is equal to the rotational speed of the sun gear Sa (the first element) of the first planetary gear mechanism PGS1, and the rotational speed of the first connection body Ca-Cb-Re including the carrier Cb (the fifth element) of the second planetary gear mechanism PGS2 becomes i/(i+1).

In addition, as a result of bringing the first clutch C1 into the connection state, the rotational speed of the third connection body Cc-Cd becomes "1" which is equal to the rotational speed of the sun gear Sa (the first element) of the first planetary gear mechanism PGS1 which is connected to the input shaft 2. Thus, the rotational speed of the ring gear Rd (the tenth element) of the fourth planetary gear mechanism PGS4 to which the output part 3 is connected is shown as "7th" in FIG. 3. Accordingly, the seventh gear position is established.

To establish an eighth gear position, the first brake B1 which is a two-way clutch is brought into the reverse rotation inhibiting state, and the third brake B3 is brought into the fixation state, and the first clutch C1 and the third clutch C3 are brought into the connection states. As a result of bringing the first brake B1 into the reverse rotation inhibiting state, forward rotation of the third connection body Cc-Cd is allowed.

In addition, as a result of bringing the third brake B3 into the fixation state, the rotational speed of the sun gear Sb (the sixth element) of the second planetary gear mechanism PGS2 becomes "0". As a result of bringing the third clutch C3 into the connection state, the rotational speed of the second connection body Ra-Sd becomes "0" which is equal to the rotational speed of the sun gear Sb (the sixth element) of the second planetary gear mechanism PGS2. As a result of bringing the first clutch C1 into the connection state, the rotational speed of the third connection body Cc-Cd becomes "1" which is equal to the rotational speed of the sun gear Sa (the first element) of the first planetary gear mechanism PGS1. Thus, the rotational speed of the ring gear Rd (the tenth element) of the fourth planetary gear mechanism PGS4 to which the output part 3 is connected becomes a speed shown as "8th" in FIG. 3. Accordingly, the eighth gear position is established.

To establish a ninth gear position, the first brake B1 which is a two-way clutch is brought into the reverse rotation inhibiting state, the third brake B3 and the fourth brake B4 are brought into the fixation states, and the first clutch C1 is brought into the connection state. As a result of bringing the first brake B1 into the reverse rotation inhibiting state, forward rotation of the third connection body Cc-Cd is allowed.

In addition, as a result of bringing the first brake B3 into the fixation state, the rotational speed of the sun gear Sb (the sixth element) of the second planetary gear mechanism PGS2 becomes "0". As a result of bringing the fourth brake B4 into the fixation state, the rotational speed of the ring gear Rh (the fourth element) of the second planetary gear mechanism PGS2 also becomes "0". As a result, a rock state in which relative rotation of the elements Sb, Cb, and Rh of the second planetary gear mechanism PGS2 is not allowed is established so that the rotational speed of the first connection body Ca-Cb-Re including the carrier Cb (the fifth element) of the second planetary gear mechanism PGS2 also becomes "0".

In addition, as a result of bringing the first clutch C1 into the connection state, the rotational speed of the third connection body Cc-Cd becomes "1" which is equal to the rotational speed of the sun gear Sa (the first element) of the first planetary gear mechanism PGS1. Thus, the rotational speed of the ring gear Rd (the tenth element) of the fourth planetary gear mechanism PGS4 to which the output part 3 is connected becomes a speed shown as "9th" in FIG. 3. Accordingly, the ninth gear position is established.

To establish a tenth gear position, the first brake B1 which is a two-way clutch is brought into the reverse rotation inhibiting state, the fourth brake B4 is brought into the fixation state, and the first clutch C1 and the third clutch C3 are brought into the connection state. As a result of bringing the first brake B1 into the reverse rotation inhibiting state, forward rotation of the third connection body Cc-Cd is allowed.

In addition, as a result of bringing the third clutch C3 into the connection state, the second connection body Ra-Sd and the sun gear Sb (the sixth element) of the second planetary gear mechanism PGS2 are rotated at the same speed. As a result of bringing the fourth brake B4 into the fixation state, the rotational speed of the ring gear Rb (the fourth element) of the second planetary gear mechanism PGS2 becomes "0". As a result of bringing the first clutch C1 into the connection state, the rotational speed of the third connection body Cc-Cd becomes "1" which is equal to the rotational speed of the sun gear Sa (the first element) of the first planetary gear mechanism PGS1. Thus, the rotational speed of the ring gear Rd (the tenth element) of the fourth planetary gear mechanism PGS4 to which the output part 3 is connected becomes a speed shown as "10th" in FIG. 3. Accordingly the tenth gear position is established.

To establish a reverse travel gear position, the first brake B1 which is a two-way clutch is brought into the fixation state, the third brake B3 is brought into the fixation state, and the second clutch C2 is brought into the connection state. As a result of bringing the third brake B3 into the fixation state and bringing the second clutch C2 into the connection state, the rotational speed of the first connection body Ca-Cb-Rc becomes i/(i+1). As a result of bringing the first brake B1 into the fixation state, rotation of the third connection body Cc-Cd is inhibited and the rotational speed of the third connection body Cc-Cd becomes "0". Thus, the rotational speed of the ring gear Rd (the tenth element) of the fourth planetary gear mechanism PGS4 to which the output part 3 is connected becomes "Rvs", which indicates reverse rotation, shown in FIG. 3. Accordingly, the reverse travel gear position is established.

The broken speed lines in FIG. 3 each represent a state where, of the four planetary gear mechanisms PGS1 to PGS4, the planetary gear mechanism transmitting no power follows the planetary gear mechanism transmitting power so that the elements of the planetary gear mechanism transmitting no power are rotated (idling).

FIG. 4 shows all the states of the clutches C1 to C3 and the brakes B1 to B4 in the above gear positions together. In the columns of the first to third clutches C1 to C3 and the second brake B2 to the fourth brake B4, a circle mark represents the connection state or the fixation state, and a blank represents the release state. In the column of the first brake B1, "R" represents the reverse rotation inhibiting state, and "L" represents the fixation state.

The underlined "R" or "L" represents a state where the rotational speed of the third connection body Cc-Cd becomes "0" due to operation of the first brake B1. In addition, "R/L" represents a state where the first brake B1 is normally in "R" (the reverse rotation inhibiting state) but is switched to "L" (the fixation state) when engine brake is applied.

FIG. 4 further shows speed change ratios (rotational speed of the input shaft 2/rotational speed of the output pan 3) and common ratios (ratios of speed change ratios between the gear positions, values each obtained by dividing the speed change ratio of a predetermined gear position by the speed change ratio of the gear position which is one position higher than the predetermined gear position) of the gear positions when the gear ratio h of the first planetary gear mechanism PGS1 is 2.734, the gear ratio i of the second planetary gear mechanism PGS2 is 1.614, the gear ratio j of the third planetary gear mechanism PGS3 is 2.681, and the gear ratio k of the fourth planetary gear mechanism PGS4 is 1.914. According to FIG. 4, the common ratio can be appropriately set.

Next, a two-way clutch is described in detail with reference to FIGS. 5A to 5C. The first brake B1 is constructed of a two-way clutch which is switchable between the fixation state in which the third connection body Cc-Cd is fixed to the casing 1 and the reverse rotation inhibiting state in which forward rotation of the third connection body Cc-Cd is allowed and reverse rotation thereof is inhibited. An example of such a two-way clutch shown in FIGS. 5A to 5C is specifically described.

Figure 5A:
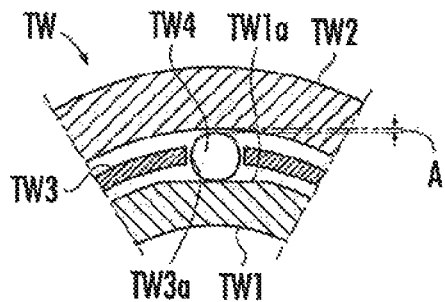
Figure 5B:
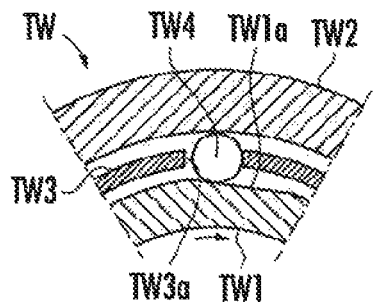
Figure 5C:
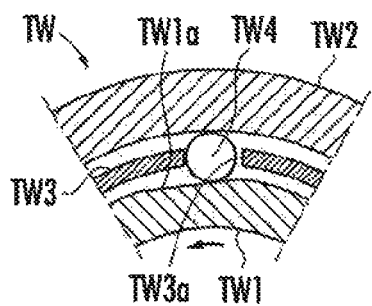

A two-way clutch TW as the first brake B1 in FIG. 5A includes an inner ring TW1 connected to the third connection body Cc-Cd, an outer ring TW2 positioned radially outward of the inner ring TW1 at an interval and connected to the casing 1, and a holding ring TW3 positioned between the inner ring TW1 and the outer ring TW2.

A plurality of cam surfaces TW1a are formed on the outer circumferential surface of the inner ring TW1. In the holding ring TW3, a plurality of cutout holes TW3a are provided so as to correspond to the cam surfaces TW1a. A roller TW4 is housed in each cutout hole TW3a. Further, the two-way clutch TW includes a meshing mechanism (not illustrated).

The meshing mechanism is configured to be switchable between an outer connection state in which the outer ring 1 connected to the holding ring TW3 and an inner connection state in which the inner ring TW1 is connected to the holding ring TW3.

The diameter of the roller TW4 is set such that a clearance A is formed when the roller TW4 is positioned at the center portion of the cam surface TW1a as illustrated in FIG. 5A and the roller TW4 is in contact with the inner ring TW1 and the outer ring TW2 when the roller TW4 is positioned at an end of the cam surface TW1 a as illustrated in FIGS. 5B and 5C.

When the meshing mechanism is in the outer connection state in which the outer ring TW2 is connected to the holding ring TW3, the roller TW4 is positioned at an end of the cam surface TW1a as illustrated in FIGS. 5B and 5C, regardless of whether the inner ring TW1 is rotated in a forward or reverse direction because the holding ring TW3 is also fixed to the casing 1.

In this case, the roller TW4 is sandwiched between the cam surface TW1a and the inner circumferential surface of the outer ring TW2 so that rotation of the inner ring TW1 is inhibited. That is, the two-way clutch TW is in the fixation state.

The meshing mechanism (not illustrated) is configured such that when the meshing mechanism is in the inner connection state in which the inner ring TW1 is connected to the holding ring TW3, the cutout hole TW3a is positioned at one end of the cam surface TW1a, as illustrated in FIG. 5B.

When the clockwise direction in FIG. 5B is a reverse direction, the reverse rotation inhibiting state is achieved by bringing the two-way clutch TW into the inner connection state in which the inner ring TW1 is connected to the holding ring TW3.

Figure 6:
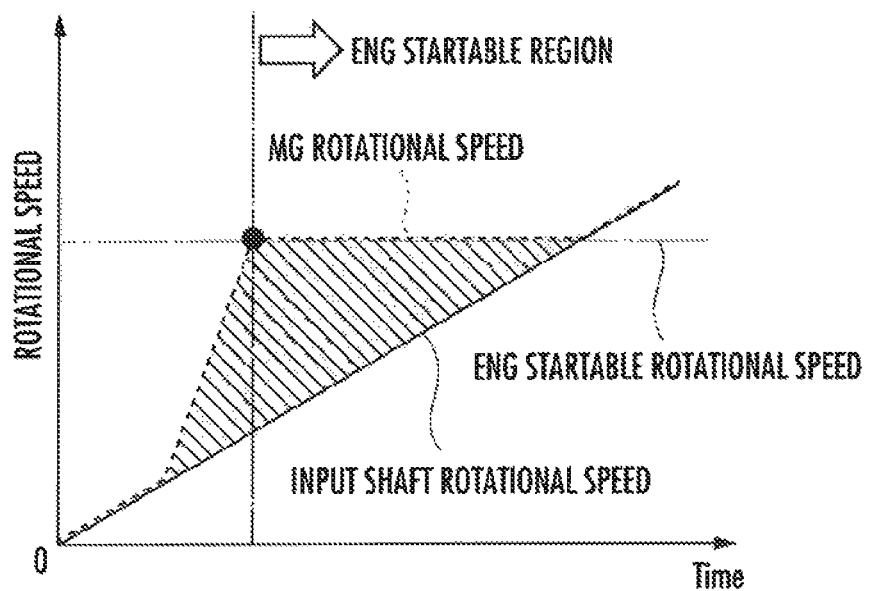
FIG. 6 is a diagram showing the relationship between a rotational speed of an electric motor and a rotational speed of an input shaft of the transmission in the first embodiment.

Here, FIG. 6 shows a graph of a case where a vehicle speed increases at a constant acceleration from a stop state. As shown in FIG. 6, in a low-speed traveling state in which the rotational speed of the electric motor MG is lower than the startable rotational speed for the internal combustion engine ENG, the rotational speed of the electric motor MG needs to be increased to the startable rotational speed for the internal combustion engine ENG.

However, since increase in rotational speed of the electric motor MG cannot be transferred to the driving wheel, power may be transferred through adjustment of an engaging force with a friction clutch or a friction brake of the automatic transmission TM. However, when driving power is adjusted with the friction clutch or the friction brake of the automatic transmission TM, the volume of the friction clutch or the friction brake needs to be larger than that of a conventional clutch or brake, so as to have resistance to heat generated during a start. Thus, an existing automatic transmission cannot be used as it is.

Therefore, the power transmission device PT of the first embodiment is provided with a start clutch 110 and the start clutch 110 adjusts driving power to be inputted to the automatic transmission TM. The power transmission device PT is described in detail below.

As illustrated in FIG. 1, the power transmission device PT includes a cylindrical clutch input part 120 which is connected to the dual mass flywheel FW and a clutch output part 130 having an inner cylindrical part 131 arranged inside the clutch input part 120. The start clutch 110 is provided between the clutch input part 120 and the inner cylindrical part 131. As a result, the clutch input part 120 and the clutch output part 130 are connected with each other in a releasable manner.

The electric motor MG is arranged radially outside of the clutch input part 120 and the clutch output part 130 so as to cover the start clutch 110 in the circumferential direction. The rotor MGa of the electric motor MG is provided with a switching mechanism 140 which can be selectively connected to the clutch input part 120 and the clutch output part 130.

The switching mechanism 140 includes a plurality of internal combustion engine side balls 141 arranged at the internal combustion engine ENG side, an internal combustion engine side holder 142 that holds the internal combustion engine side balls 141 at intervals in the circumferential direction, a plurality of transmission side balls 143 arranged at the automatic transmission TM side, a transmission side holder 144 that holds the transmission side balls 143 at intervals in the circumferential direction, and a cylindrical fixing part 145 that fixes the internal combustion engine side holder 142 and the transmission side holder 144 radially inside.

The fixing part 145 forms a part of the rotor MGa. A slider 146 which is movable in the rotational axis direction is arranged inside of the fixing part 145. Both ends of, in the rotational axis direction, the slider 146 are inclined surfaces 146a each of the thicknesses of which gradually becomes smaller radially outside.

An annular protrusion 146b which projects radially inside is provided at the center portion of the inner circumferential surface of the slider 146. A coil spring 147 serving as an urging part is arranged between the lateral surface of the annular protrusion 146b at the internal combustion engine ENG side and the internal combustion engine side holder 142. The coil spring 147 urges the slider 146 to the automatic transmission TM side via the annular protrusion 146b.

Figure 7:
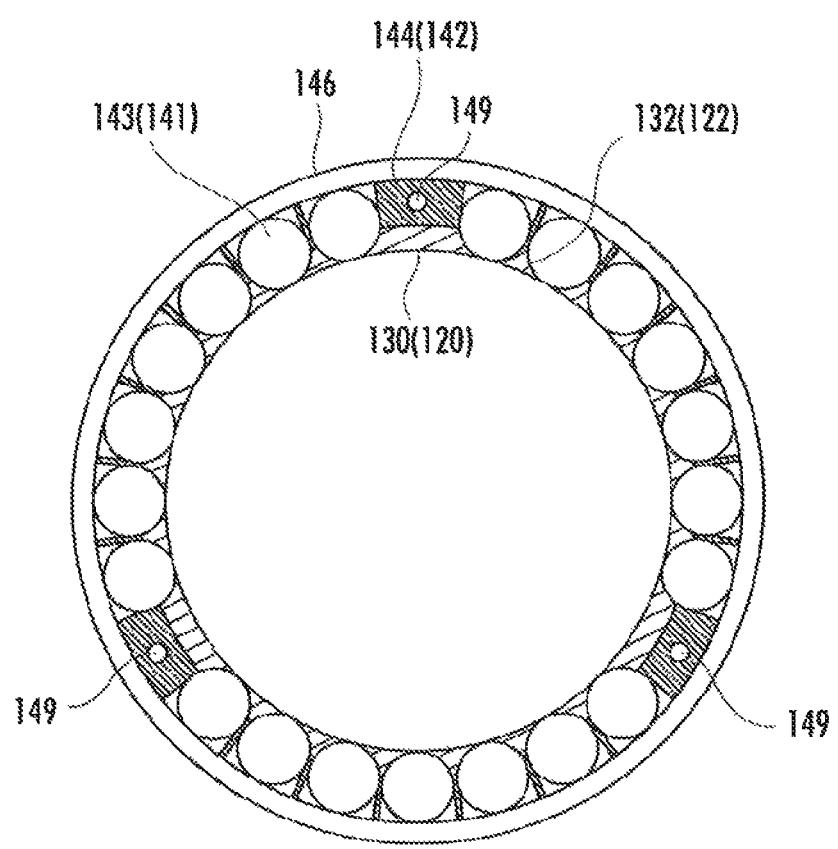
FIG. 7 is a diagram illustrating a state where a rotor and a clutch output part are connected to each other in the first embodiment.

The inclined surface 146a of the slider 146 urged by the coil spring 147 is inserted into the radially outside of the transmission side balls 143 so that the transmission side balls 143 are moved radially inside. In the outer circumferential surface of the clutch output part 130, output side receiving holes 132 that receive the transmission side balls 143 moved radially inside by the slider 146 are provided. As illustrated in FIG. 7, the transmission side balls 143 are fitted in the output side receiving holes 1 so that the fixing part 145 is engaged with the clutch output part 130. This state is defined as an output side connection state.

Figure 8:
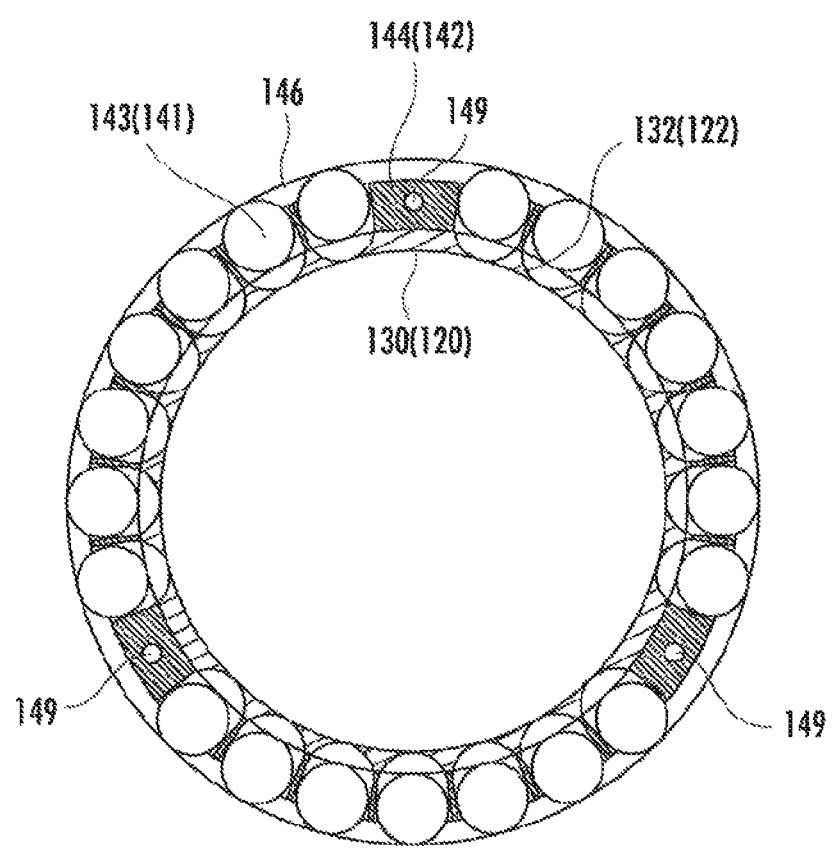
FIG. 8 is a diagram illustrating a state where the rotor and the clutch input part are released from each other in the lint embodiment.

Each output side receiving hole 132 is formed to be in depth less than the radius of the transmission side ball 143. Thus, in a case where the transmission side balls 143 are not moved radially inside by the slider 146, when a difference in rotational speed (hereinafter, "difference rotation") is generated between the fixing part 145 and the clutch output part 130, the transmission side balls 143 come off radially outside with the semicircular output side receiving holes 132 serving as guides so that engagement between the fixing part 145 and the clutch output part 130 via the transmission side balls 143 is released (see FIG. 8).

A hydraulic chamber 148 is formed among the lateral surface of the annular protrusion 146b at the automatic transmission TM side, the fixing part 145, and the transmission side holder 144. A hydraulic path 149 that supplies a hydraulic pressure to the hydraulic chamber 148 is provided through the clutch output part 130, the fixing part 145, and the transmission side holder 144. The hydraulic chamber 148 and the hydraulic path 149 form a part of the hydraulic actuator of the first embodiment.

Figure 9:
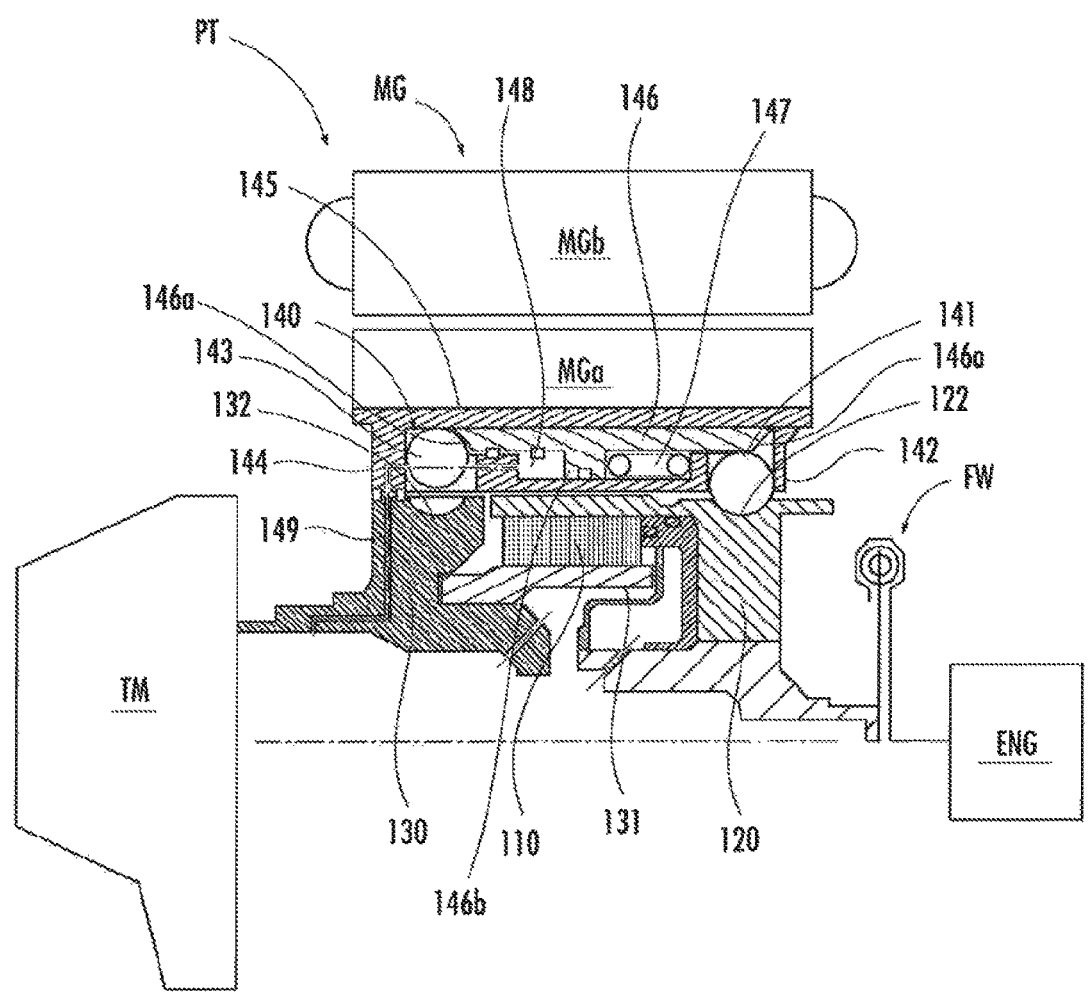
FIG. 9 is a diagram illustrating a state where the electric motor is connected to an internal combustion engine, in the power transmission device of the first embodiment.

As illustrated in FIG. 9, when a predetermined hydraulic pressure is supplied from the hydraulic path 149 to the hydraulic chamber 148, the slider 146 moves to the internal combustion engine ENG side while resisting an urging force from the coil spring 147. The inclined surface 146a of the slider 146 having moved to the internal combustion engine ENG side is inserted into the radially outside of the internal combustion engine side balls 141, and the internal combustion engine side balls 141 move radially inside.

In the outer circumferential surface of the clutch input part 120, semicircular input side receiving holes 122 that receive the internal combustion engine side balls 141 moved radially inside by the slider 146 are provided. The internal combustion engine side balls 141 are fitted into the input side receiving holes 122 so that the fixing part 145 is engaged with the clutch input part 120 (see FIG. 7). This state is defined as an input side connection state.

Each input side receiving hole 122 is formed to be in depth less than the radius of the internal combustion engine side ball 141. Thus, in a case where the internal combustion engine side balls 141 are not moved radially inside by the slider 146, when difference rotation is generated between the fixing part 145 and the clutch input part 120, the internal combustion engine side balls 141 come off radially outside with the semicircular input side receiving holes 122 serving as guides so that engagement between the fixing part 145 and the clutch input part 120 via the internal combustion engine side balls 141 is released (see FIG. 8).

According to the power transmission device PT of the first embodiment, during travelling using the electric motor MG only, connection between the electric motor MG and the internal combustion engine ENG can be cut off by sliding the slider 146 to the transmission TM side and releasing the start clutch 110, and thus, efficiency is not deteriorated.

Further, a conventional transmission with a torque converter can be used as a transmission for a hybrid vehicle only by attaching, in place of the torque converter, the power transmission device PT of the first embodiment to the automatic transmission TM without changing the clutch capacity of the transmission. Thus, the manufacturing procedures can be simplified and the manufacturing cost can be made low.

In the power transmission device PT of the first embodiment, the coil spring 147 as the urging part is arranged at the internal combustion engine ENG side and the hydraulic chamber 148 is arranged at the automatic transmission TM side. However, a power transmission device according to the present invention is not limited to this. For example, in some cases, the urging part may be arranged at the transmission side and the hydraulic chamber may be arranged at the internal combustion engine side.

In addition, the urging part is not limited to the coil spring 147. For example, urging may be performed by using another component such as an elastic body and a fluid pressure (a hydraulic pressure).

The power transmission device PT may be configured such that, through hydraulic pressure adjustment, the slider 146 can be brought into a neutral state in which none of the internal combustion engine side balls 141 and the transmission side balls 143 is pressed down radially inward. This configuration can prevent reduction in efficiency due to companion turning by the electric motor MG, by bringing the switching mechanism 140 into the neutral state when the vehicle travels using driving power of the internal combustion engine ENG only, for example, when regeneration by the electric motor is impossible because sufficient power is stored in a secondary battery, or when the electric motor MG does not work.

An alternative configuration may be achieved by providing a magnet on the inner circumferential surface of the fixing part 145 such that, when the internal combustion engine side balls 141 or the transmission side balls 143 are not pressed down radially inside by the slider 146, the internal combustion engine side ball 141 or the transmission side ball 143 are attracted to the inner circumferential surface of the fixing part 145 to spread radially outside. When the magnetic force of the electric motor MG provides a magnet operation to the fixing part 145, the same effect can be provided without providing a magnet to the inner circumferential surface of the fixing part 145.

The fixing part 145 may be integrated with the rotor MGa. Further, using the hydraulic actuator has been described. However, alternatively, an electric actuator may be used to move the slider.

Although in the power transmission device PT of the present embodiment, the planetary gear mechanism has been explained as the transmission, the present invention is not limited thereto, and the transmission of the present invention may be, for example, a CVT (continuous variable transmission).

[Second Embodiment]

Figure 10:
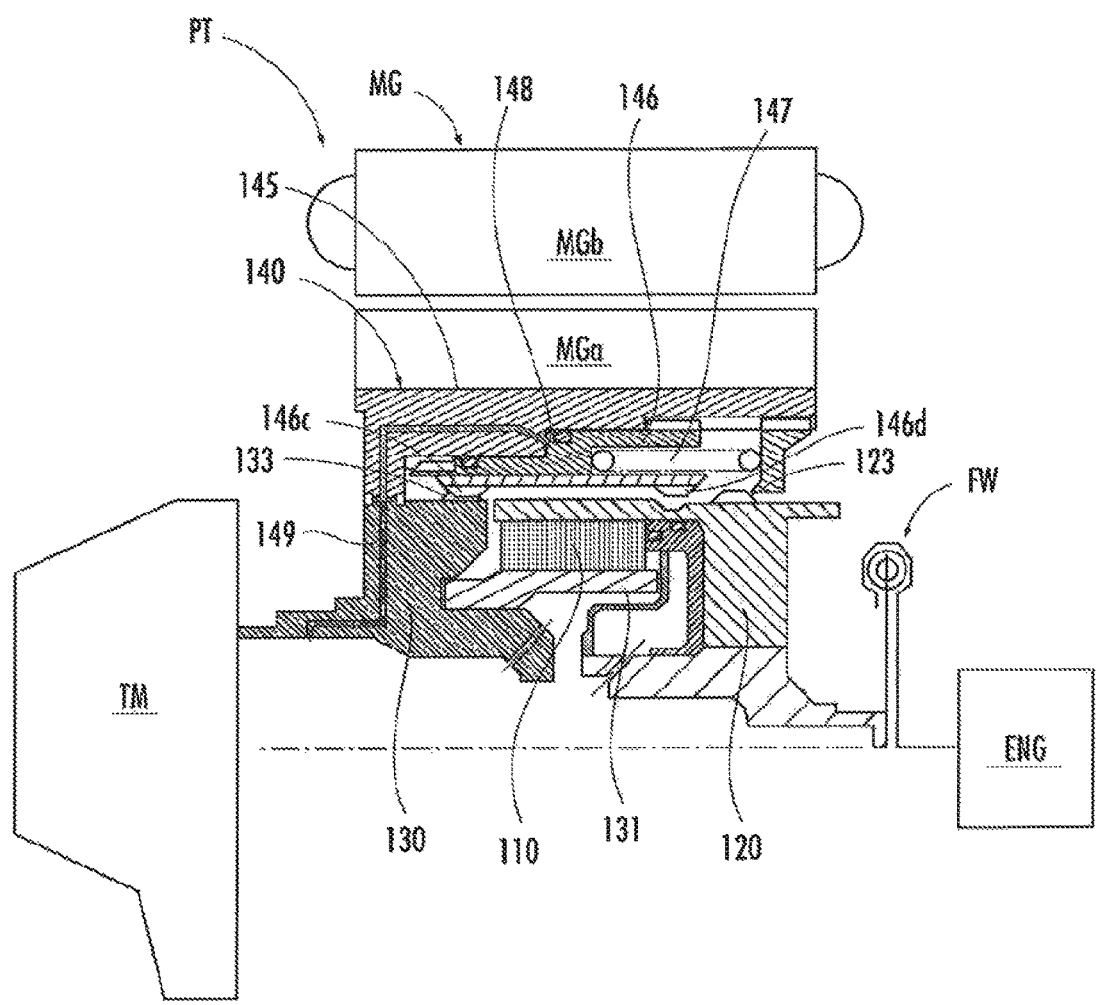
FIG. 10 is a diagram illustrating a second embodiment of the power transmission device of the present invention.
Figure 11:
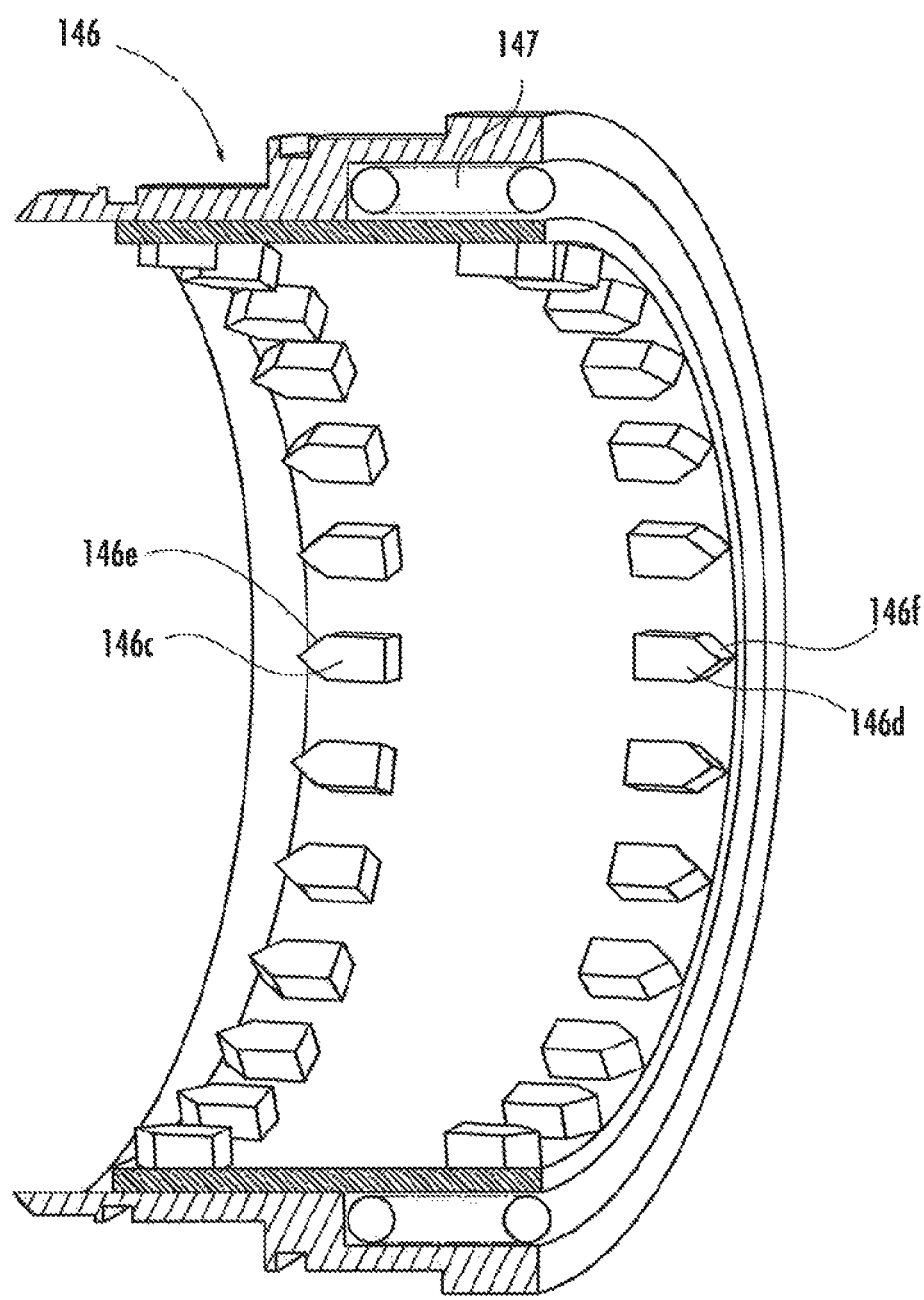
FIG. 11 is a diagram illustrating a sleeve of the second embodiment.
Figure 12:
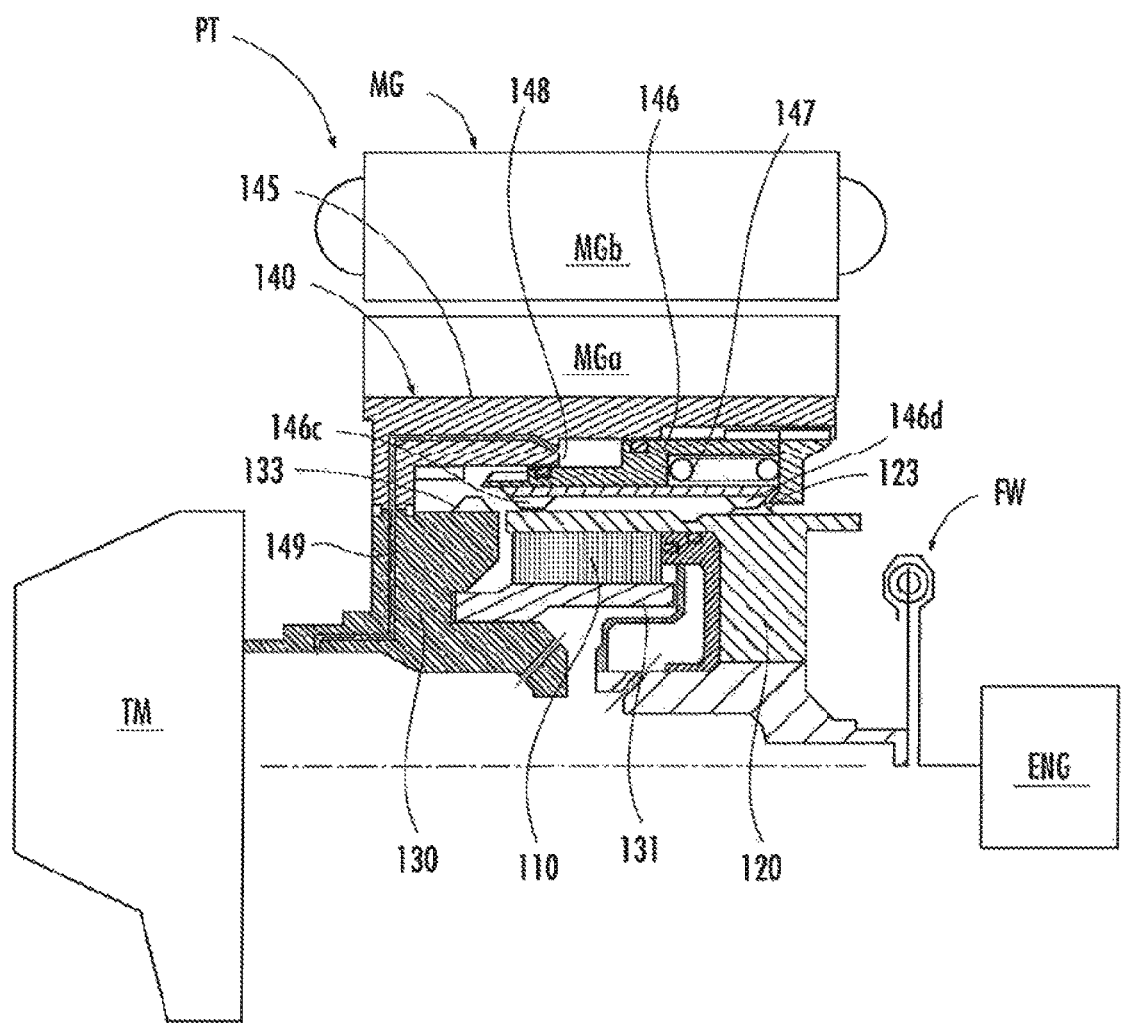
FIG. 12 is a diagram illustrating a state where an electric motor and an internal combustion engine are connected to each other, in the power transmission device of the second embodiment.

A power transmission device PT of the second embodiment of the present invention is described with reference to FIGS. 10 to 12. Components same as those in the first embodiment are represented by the same reference characters and explanations thereof are omitted.

The cylindrical slider 146 of the second embodiment has transmission side internal teeth 146c arranged at the transmission TM side end of the inner circumferential surface of the slider 146 and internal combustion engine side internal teeth 146d arranged at the internal combustion engine ENG side end of the inner circumferential surface of the slider 146.

The transmission side internal teeth 146c each have lateral surfaces 146e having a V shape pointed to the transmission TM side. The internal combustion engine side internal teeth 146d each have lateral surfaces 146f having a V shape pointed to the internal combustion engine side.

Output side external teeth 123 are provided an the outer circumferential surface of the clutch output part 130 so as to mesh with the transmission side internal teeth 146a when the slider 146 is urged by the coil spring 147 and moved to the transmission TM side. As a result of meshing of the transmission side internal teeth 146c with the output side external teeth 133, the fixing part 145 is engaged with the clutch output part 130 and engagement between the fixing part 145 and the clutch input part 120 is released.

Input side external teeth 123 are provided on the outer circumferential surface of the clutch input part 120 so as to mesh with the internal combustion engine side internal teeth 146d when the slider 146 is, while resisting an urging force from the coil spring 147, moved to the internal combustion engine ENG side by a hydraulic pressure supplied to the hydraulic chamber 148. As a result of meshing of the internal combustion engine side internal teeth 146d with the input side external teeth 123, the fixing part 145 is engaged with the clutch input part 120 and engagement between the fixing part 145 and the clutch output part 130 is released.

The coil spring 147 of the second embodiment is arranged so as to urge the slider 146 to the transmission TM side with respect to the fixing part 145.

According to the power transmission device PT of the second embodiment, during travelling using the electric motor MG only, connection between the electric motor MG and the internal combustion engine ENG can be cut off by sliding the slider 146 to the transmission TM side and releasing the start clutch 110, and thus, efficiency is not deteriorated.

Further, a conventional transmission with a torque converter can be used as a transmission for a hybrid vehicle, only by attaching, in place of the torque converter, the power transmission device PT of the second embodiment to the automatic transmission TM without changing the clutch capacity of the transmission. Thus, the manufacturing procedures can be simplified and the manufacturing cost can be made low.

Also in the power transmission device PT of the second embodiment, the coil spring 147 as the urging part is arranged at the internal combustion engine ENG side and the hydraulic chamber 148 is arranged at the automatic transmission TM side. However, the power transmission device according to the present invention is not limited to this. For example, in some cases, the urging part may be arranged at the transmission side and the hydraulic chamber may be arranged at the internal combustion engine side.

In addition, the urging part is not limited to the coil spring 147. For example, urging may be performed by using another component such as an elastic body and a fluid pressure (a hydraulic pressure).

The power transmission device PT may be configured such that, through hydraulic pressure adjustment, the slider 146 can be brought into a neutral state in which none of the internal combustion engine side internal teeth 146d and the transmission side internal teeth 146c engages. This configuration can prevent deterioration in efficiency due to companion turning by the electric motor MG, by bringing the switching mechanism 140 into the neutral state when the vehicle travels using driving power of the internal combustion engine ENG only, for example, when regeneration by the electric motor is impossible because sufficient power is stored in a secondary battery, or when the electric motor MG does not work.

Although in the power transmission device PT of the present embodiment, the planetary gear mechanism has been explained as the transmission, the present invention is not limited thereto, and the transmission of the present invention may be, for example, a CVT (continuous variable transmission).

What is claimed is:

1. A power transmission device comprising:
a clutch input part to which driving power is transmitted from an internal combustion engine;
a clutch output part which is connected to a transmission;
a start clutch which can connect the clutch input part and the clutch output part to each other; and
an electric motor which has a rotor,
wherein the clutch input part, the clutch output part, and the start clutch are arranged radially inside of the rotor,
wherein the power transmission device further comprises a switching mechanism, provided in addition to the start clutch, which is switchable between an output side connection state in which the rotor and the clutch output part are connected to each other and an input side connection state in which the rotor and the clutch input part are connected to each other,
wherein the switching mechanism includes: a slider which is movable in an axial direction;
wherein an actuator which moves the slider; an internal combustion engine side ball which is arranged, at an internal combustion engine side, radially inside of the rotor; and a transmission side ball which is arranged, at a transmission side, radially inside of the rotor, and further includes:
an output side receiving hole which can receive the transmission side ball is provided in the clutch output part;
an input side receiving hole which can receive the internal combustion engine side ball is provided in the clutch input part; and
wherein
when the slider is positioned at the transmission side, the switching mechanism enters the output side connection state by causing the transmission side ball to engage with the output side receiving hole to cause the rotor and the clutch output part to engage with each other, and
when the slider is positioned at the internal combustion engine side, the switching mechanism enters the input side connection state by causing the internal combustion engine side ball to engage with the input side receiving hole to cause the rotor and the clutch input part to engage with each other.

2. The power transmission device according to claim 1, wherein
the input side receiving hole is formed to be in depth less than the radius of the internal combustion engine side ball, and
the output side receiving hole is formed to be in depth less than the radius of the transmission side ball.

3. The power transmission device according to claim 1, wherein
the rotor has a magnet which maintains a state in which the internal combustion engine side ball and the transmission side ball are off from the input side receiving hole and the output side receiving hole, respectively.

4. A power transmission device comprising:
a clutch input part to which driving power is transmitted from an internal combustion engine;
a clutch output part which is connected to a transmission;
a start clutch which can connect the clutch input part and the clutch output part to each other; and
an electric motor which has a rotor,
wherein the clutch input part, the clutch output part, and the start clutch are arranged radially inside of the rotor,
wherein the power transmission device further comprises a switching mechanism, provided in addition to the start clutch, which is switchable between an output side connection state in which the rotor and the clutch output part are connected to each other and an input side connection state in which the rotor and the clutch input part are connected to each other,
wherein the switching mechanism includes a cylindrical slider which is movable in an axial direction and an actuator which moves the slider,
wherein on an inner circumferential surface of the slider, a transmission side internal tooth positioned at a transmission side and an internal combustion engine side internal tooth positioned at an internal combustion engine side are provided,
wherein an output side external tooth which can mesh with the transmission side internal tooth is provided on the clutch output part,
wherein an input side external tooth which can mesh with the internal combustion engine side internal tooth is provided on the clutch input part, and
wherein
when the slider is positioned at the transmission side, the switching mechanism causes the transmission internal tooth to engage with the output side external tooth to cause the rotor and the clutch output part to engage with each other, and
when the slider is positioned at the internal combustion engine side, the switching mechanism causes the internal combustion engine side internal tooth to engage with the input side external tooth to cause the rotor and the clutch input part to engage with each other.

5. A power transmission device comprising:
a clutch input part to which driving power is transmitted from an internal combustion engine;
a clutch output part which is connected to a transmission;
a start clutch which can connect the clutch input part and the clutch output part to each other; and
an electric motor which has a rotor,
wherein the clutch input part, the clutch output part, and the start clutch are arranged radially inside of the rotor,
wherein the power transmission device further comprises a switching mechanism, provided in addition to the start clutch, which is switchable between an output side connection state in which the rotor and the clutch output part are connected to each other and an input side connection state in which the rotor and the clutch input part are connected to each other, and
wherein the switching mechanism is switchable to, in addition to the output side connection state and the input side connection state, a neutral state in which connections between the rotor and the clutch output part, and between the rotor and the clutch input part are cut off.

* * * * *